2,883,437

ALKYLATION PROCESS

Milton M. Wald, Oakland, and John H. Raley, Walnut Creek, Calif., assignors to Shell Development Company, New York, N.Y., a corporation of Delaware No Drawing. Application April 10, 1958
Serial No. 727,556

17 Claims. (Cl. 260—668)

This invention relates to the alkylation of saturated hydrocarbons with olefinic hydrocarbons and is more particularly concerned with promoted alkylation.

Processes for the alkylation of paraffinic hydrocarbons with olefins are well known in the art. Great commercial importance has been achieved by acid-catalyzed processes for the alkylation of isoparaffins with olefins. Catalysts for these alkylation processes are mineral acids, such as sulfuric acid and hydrofluoric acid. Other acidic materials, e. g., aluminum chloride, may also serve as catalysts. In general, the systems utilizing acidic catalysts are heterogeneous. They may also be homogeneous, e.g., when aluminum bromide is used in a liquid system.

It is also known to conduct the alkylation of paraffins with olefins thermally, at temperatures of 500° C. and higher and pressures of over 4000 p.s.i.g. Thermal alkylation is not today practiced commercially, although the reaction may occur to some extent in so-called thermal polymerization processes in which, for example, mixed paraffinic and olefinic feeds of three to four carbon atoms per molecule are exposed to temperatures of 500°–600° C. at pressures above 1000 p.s.i.g.

It has been proposed to promote the alkylation of paraffins with olefins by certain so-called homogeneous catalysts to be used in vapor phase. Specifically, organic halogen compounds and organic nitro compounds have been proposed for use as such catalysts. These homogeneously catalyzed alkylation processes have not found commercial acceptance. The homogeneous catalysts proposed heretofore have a variety of shortcomings. For example, many of the compounds are relatively expensive; many are quite corrosive; and many are difficult to remove from the alkylation products. Generally, the catalysts cannot be recovered and reused. This makes most, if not all, the previously-proposed compounds too expensive for commercial use.

The previously-proposed so-called homogeneous catalysts have the further disadvantage that, in the alkylation of a paraffin with an olefin, they lead to the formation of a relatively high proportion of a saturated product which is not the product of reaction between the originally charged paraffin and olefin, but is the product of reaction of molecules of the originally charged olefin with other molecules thereof, ultimately saturated by a transfer of hydrogen atoms. In the production of gasoline, the saturated hydrocarbons produced by interreaction of the olefins are generally of much lower octane number than the true alkylation product.

It is an object of the present invention to provide an efficient process for alkylating saturated hydrocarbons with olefinic hydrocarbons. Another object of this invention is to provide an efficient process for alkylating saturated aliphatic hydrocarbons with unsaturated aliphatic hydrocarbons to produce high yields of high-octane gasoline. A more specific object is to provide a process for alkylating isobutane with ethylene or propylene to produce high yields of high-octane gasoline. Another object of this invention is to alkylate higher paraffinic hydrocarbons, e.g., waxes, with lower olefins, e.g., ethylene, to produce alkylation products having modified properties. Another object is to alkylate the alkyl portion of aryl-substituted alkanes (cyclic or noncyclic) with olefins. Other objects and advantages of the present invention will become apparent to those skilled in the art from the following description.

It has recently been found that certain compounds not recognized by the prior art for the purpose are especially suitable and advantageous non-acidic promoters of alkylation. These compounds are the organic disulfides and the sulfhydryl compounds. They are superior in that they lead to the production of a liquid product containing an especially high ratio of the alkylate to the homo reaction product of the olefins. Further, $H_2S$ and some organic sulfhydryl compounds and disulfides are readily and cheaply available in the ordinary petroleum refinery. They are relatively noncorrosive, and they or their decomposition products are generally readily removed from the resulting alkylate.

It has now been found that alkylation reactions in which organic disulfides or sulfhydryl compounds are employed as catalysts can be carried out at improved conversion rates without loss in selectivity by employing a small amount of free oxygen to further promote the reaction.

Broadly stated, this invention is a process for alkylating saturated hydrocarbons, particularly paraffins, including aryl-substituted paraffins, with olefinic hydrocarbons, which comprises contacting the saturated and the olefinic hydrocarbons in a reaction zone under alkylating conditions with a small amount of an alkylation promoter consisting essentially of a mixture of a small amount of free oxygen with a sulfur compound selected from the group consisting of organic disulfides and sulfhydryl compounds. Preferably the promoters form with the hydrocarbon reactants a single homogeneous phase at the alkylation conditions of the reaction zone.

A number of advantages of the so-called homogeneous catalysis of alkylation have been described in the prior art. All of these advantages may be realized in the process of the present invention. Thus, the present invention permits the alkylation of normal as well as isoparaffinic hydrocarbons with olefins. Relatively low temperatures are employed compared to the noncatalytic thermal alkylation. Intimate contact is easily obtained in homogeneous as contrasted to heterogeneous catalysis.

In addition to the previously-recognized advantages of the so-called homogeneous alkylation, the present invention permits the promotion of alkylation with a readily-available relatively noncorrosive material and permits the production of a higher proportion of the desired reaction product of paraffin and olefin than is possible in the unpromoted thermal alkylation or found in the alkylation promoted by the non-acidic catalysts known to the prior art.

A significant difference between the alkylation process of this invention and the acid-catalyzed alkylation processes is that the alkylation product itself is of a different chemical nature. For example, in the acid-catalyzed alkylation of isobutane with ethylene, which can be carried out over aluminum chloride catalyst, the predominant alkylation product is 2,3-dimethylbutane, also known as diisopropyl. By contrast, the alkylation of isobutane with ethylene according to the present invention leads to the formation of 2,2-dimethylbutane, also known as neohexane, to the substantial exclusion of diisopropyl. When reacting isobutane with propylene by means of acidic alkylation catalysts, the predominant alkylation products are 2,3-dimethylpentane and 2,4-dimethylpentane. In the alkylation of isobutane with propylene in accordance with this invention the predominant alkylation product is 2,2-dimethylpentane.

In general, the product of alkylation in this process is the result of the least substituted carbon of the double bond being joined directly to a tertiary carbon atom of an isoparaffin or to a secondary carbon atom of a normal paraffin. The resulting products are recovered as such from the reaction.

The sulfhydryl compounds suitable as alkylation promoters in this invention are compounds having the formula RSH, where R stands for hydrogen or for a hydrocarbyl group which may be an alkyl or aryl group or a substituted alkyl or aryl group. All sulfhydryl compounds are not full equivalents of one another as alkylation promoters. Thus, it has been found that thiophenol is substantially superior to methyl mercaptan and to hydrogen sulfide. For any given type of sulfhydryl compound, however, the simplest ones will ordinarily be preferred because they serve the purpose adequately and are more readily and cheaply available than more complex compounds. Thus, thiophenol is a preferred alkylation promoter in the process of this invention and $H_2S$ and methyl mercaptan are also quite suitable. Other suitable sulfhydryl compounds are, for example, the mercaptans in which R represents an alkyl group such as ethyl, propyl, isopropyl, n-butyl, sec. butyl, tert. butyl, and the various forms of amyl, hexyl, octyl, decyl, dodecyl and similar alkyl groups. More preferred sulfhydryl compounds are the thiophenols in which R represents tolyl, xylyl or other polymethylphenyl groups or other phenyl groups having from one to five nuclear alkyl substituents of from one to four carbon atoms, each. Other suitable sulfhydryl compounds are mercaptans in which R represents a cycloalkyl group or substituted cycloalkyl group such as cyclopentyl, cyclohexyl and alkyl-substituted cyclopentyl and cyclohexyl groups such as those having from one to five nuclear substituents of from one to four carbon atoms each. All of the above-named organic compounds are hydrocarbylthiols, i.e. compounds in which R represents a monovalent hydrocarbon radical.

The organic disulfides suitable as alkylation promoters in this invention are compounds having the formula R—S—S—R' wherein R and R' may be identical or they may be two different groups of the same type or they may be groups of different types. Ordinarily the simplest organic disulfides are preferred because they serve the purpose adequately and are more readily and cheaply available than more complex compounds. For example, dimethyldisulfide and diphenyldisulfide have been successfully used in the process of this invention and are preferred alkylation promoters. Other suitable disulfides are, for example, the dialkyldisulfides in which the groups R and R' are methyl, ethyl, propyl, isopropyl, n-butyl, sec. butyl, tert. butyl, and the various forms of amyl, hexyl and similar alkyl groups. Other suitable disulfides are the diaryldisulfides in which R and R' are phenyl, tolyl, xylyl or other polymethylphenyl groups or other phenyl groups having from one to five alkyl substituents of from one to four carbon atoms, each. Other suitable disulfides are dicycloalkyldisulfides, e.g., those in which R and R' are cyclopentyl, cyclohexyl and alkyl-substituted cyclopentyl or cyclohexyl groups, such as those having from one to five substituents of from one to four carbon atoms, each. The disulfide may also be methylphenyldisulfide or another alkylaryldisulfide or an alkylcycloalkyldisulfide or a cycloalkylaryldisulfide. All of the above-named compounds are dihydrocarbyldisulfides, i.e. compounds in which both R and R' represent a monovalent hydrocarbon radical.

The disulfides and sulfhydryl compounds employed as promoters need not be pure compounds. The sulfur component of the promoter may be a mixture of sulfhydryl compounds, e.g., a mixed mercaptan and/or thiophenol fraction recovered in the extractive sweetening of sour petroleum distillate fractions, such as liquefied petroleum gases, gasoline or kerosene. In the simple caustic washing of light petroleum fractions including gasoline, hydrogen sulfide and the lower mercaptans up to about butyl mercaptan are readily removed due to their solubility in caustic and may be recovered from the caustic by a suitable treatment, such as steaming. The sulfur component may also be a mixture of disulfides, e.g., the mixture which is produced in the sweetening of sour hydrocarbon fractions in which mercaptans are converted to disulfides. The disulfides resulting in such sweetening processes are predominantly mixed dihydrocarbyldisulfides having boiling points slightly higher than the hydrocarbon fraction being treated. Disulfides suitable for this invention are, for example, produced in the sweetening of liquefied petroleum gases, gasoline or kerosene.

The alkylation promoters of this invention may be solids, liquids or gases under normal conditions.

Preferred sulfhydryl compounds are $H_2S$ and those organic compounds having from one to fifteen carbon atoms per molecule and having such volatility or solubility that they exist in the same phase as the reactants under alkylation conditions. Preferred disulfides are those having from two to twenty carbon atoms per molecule and having such volatility or solubility that they exist in the same phase as the reactants under alkylation conditions.

The amount of the sulfur compound used in the process of this invention varies from about 0.1 to about 5 mole percent based on the total hydrocarbon charge. It is preferably between about 0.4 and about 1.4 mole percent. For a given system of hydrocarbon reactants and alkylation conditions there is generally an optimum range of the amount of sulfur promoter to be employed which leads to best results. Use of insufficient or excessive amounts of promoter tends to favor the production of undesired reaction products of the olefins at the expense of the desired alkylate.

The sulfur-containing alkylation promoter is further promoted with free oxygen in accordance with this invention. The oxygen is suitably added in the form of oxygen gas to the initial reaction mixture. It is sometimes preferred to add the oxygen in the presence of an inert diluent, e.g., nitrogen. Air is thus a suitable source of free oxygen. The amount of oxygen employed to promote the action of the sulfur compound is suitably in the range from 0.05 to 5.0 moles of $O_2$ per mole of sulfur compound, but not in excess of about 5 mole percent, based on the total hydrocarbon charge. A preferred proportion of oxygen to sulfur compound is in the range from 0.1 to 2.0 moles of $O_2$ per mole of sulfur compound. Addition of oxygen within the above ranges increases the reaction rate and results in increased olefin conversion to alkylate during a given contact time.

The saturated, i.e. non-olefinic, hydrocarbon component of the reaction mixture may be any saturated hydrocarbon having three or more carbon atoms per molecule. Normal and branched paraffins are particularly suitable. Fully or partially hydrogenated non-olefinic cyclic hydrocarbons may also be alkylated in accordance with this process. This includes cyclopentane, cyclohexane, their alkyl derivatives, decalin, tetralin and others.

The olefinic reactant may be any olefinic hydrocarbon having two or more carbon atoms per molecule. Nonconjugated olefins, and particularly mono-olefins are preferred. Ethylene and propylene are particularly suitable and are especially preferred in many cases, but higher olefins, e.g., butene-1, butene-2, isobutene, the normal and branched pentenes, hexenes, heptenes, octenes and higher olefins may also be employed as alkylating agents.

When the alkylation process is carried out for the purpose of producing gasoline, the preferred saturated reactant is isobutane and the most preferred olefin reactant is propylene. Ethylene or mixed butenes are also very suitable olefin feed stocks in the alkylation of isobutane. Other suitable paraffinic feed stocks for the production of motor gasoline are propane, n-butane and the pentanes, particularly isopentane. n-Hexane and methylpentanes are also suitable, especially when the olefin is ethylene or propylene.

Long-chain paraffins having from about fifteen to about thirty carbon atoms per molecule are very suitable feed components for a liquid-phase alkylation, particularly with ethylene.

Aryl-substituted alkane hydrocarbons suitable for alkylation include toluene, the polymethylbenzenes, ethylbenzene, polyethylbenzenes, other alkylbenzenes and polyalkylbenzenes, e.g., cumene and polyisopropylbenzenes, alkyl- and polyalkylnaphthalenes, and so forth.

The temperatures used in the alkylation reaction zone of this invention are in the range from 200° to 550° C., inclusive. The preferred temperatures are in the range of from 300° to 450° C. At the higher temperatures in the given range the higher pressures in the range specified below are necessary.

Reaction times are generally in the range of from one-half hour to twenty hours. Longer reaction times are not required. Shorter ones may be employed, down to five to ten minutes. The shorter times are useful at the higher temperatures in the ranges given.

The pressures used in the alkylation reaction zone of this invention, when the reactants are in vapor phase, are in the range of from about 650 p.s.i.g. to about 15,000 p.s.i.g. or more and preferably from about 750 p.s.i.g. to about 2500 p.s.i.g. Pressures of about 150 p.s.i.g. and higher may be used in liquid-phase reactions.

As in other alkylation processes, the selectivity to the desired alkylation product is increased by maintaining a relatively high ratio of the paraffin to the olefin in the alkylation reaction zone. The molar ratio of saturated hydrocarbon to olefinic hydrocarbon should be at least about 1:1 and is preferably in the range from 2:1 to 10:1. Higher ratios may be employed.

The process of the invention may be carried out in batch or in continuous reaction systems. In a batch system the reaction mixture of saturated and olefinic hydrocarbon, sulfur compound and oxygen is charged to a reaction vessel, e.g., an autoclave, where it is rapidly heated to reaction conditions of temperature and pressure. It is also convenient to inject additional olefin and, sometimes, additional sulfur compound and oxygen into the mixture during the course of the reaction.

In a continuous reaction system, a mixture of saturated and olefinic hydrocarbon, sulfur compound and oxygen is passed through a reaction zone which may be, for example, a series of chrome-steel or chrome-nickel-steel tubes in a furnace, maintained at the desired reaction temperature and pressure. There may be a soaking zone such as a drum, following the tubular heater.

When the reaction is completed, either in a batch or continuous system, the reaction mixture is treated to recover the desired product. For example, in the production of gasoline by alkylation of hydrocarbons having three and four carbon atoms per molecule, the reaction product is fractionated to stabilize it by removing the normally gaseous hydrocarbons, which may be returned to the reaction zone. A liquid alkylate fraction of the desired boiling range is recovered as a gasoline product.

In the production of gasoline hydrocarbons, in which a sulfhydryl compound is the promoter, it preferably boils outside the gasoline boiling range. For example, when $H_2S$ or methyl mercaptan is employed, the residual promoter is withdrawn with the gaseous portion of the reactor effluent. If the chosen promoter is a disulfide, it may be chosen such that its decomposition products are not found in the gasoline boiling range. For example, when dimethyldisulfide is employed, the decomposition products include methyl mercaptan which is withdrawn with the gaseous portion of the reactor effluent. In such cases the liquid alkylation product needs no further treatment to be suitable for use as a gasoline. Where portions of the sulfhydryl promoter or of the mercaptan resulting from decomposition of a disulfide promoter are present in the gasoline reaction product, the latter may be subjected to a conventional treating or sweetening operation, such as caustic washing, Doctor sweetening, solutizer sweetening, hypochlorite sweetening or other known methods. If an extractive method is employed coupled with non-oxidative solvent regeneration, the sulfhydryl compounds or disulfides recovered from the sweetening process are suitably separated and used as promoter in the alkylation reaction.

The following examples are illustrative of the present invention but are not to be considered as limiting thereon:

EXAMPLE I

Run No. 1 was made for comparative purposes without use of oxygen promoter. A sealed frangible vial containing a weighed amount of thiophenol was placed in a stainless steel rocking autoclave, which was then closed, evacuated and weighed. Isobutane was then admitted by direct connection to a tank while the vessel was chilled in ice. The vessel was allowed to warm to room temperature and was again accurately weighed. Ethylene was then admitted by direct connection to a cyclinder and after ethylene addition was completed the vessel was again weighed. The vial of thiophenol was then broken and the autoclave was rapidly heated to a temperature of 400° C., at which temperature it was maintained for a period of two hours. The pressure in the vessel at reaction conditions was approximately 1000 p.s.i.g. In this run, the mole ratio of isobutane to ethylene was 2.0:1 and the amount of thiophenol expressed as mole percent based on the total hydrocarbons, was 1.1%.

After completion of the reaction the vessel was cooled to room temperature, weighed to insure absence of loss due to leakage, and evacuated by connecting it through a series of cold traps to a gas holder. Complete removal of product from the autoclave was insured by heating the vessel to 120°–130° C. at 1 mm. pressure. The recovered liquid and gas were analyzed chromatographically. After removal of all product the autoclave was again weighed and the increase in weight reported as residue.

The distribution of essential reaction products observed in run No. 1 is reported in Table I. In this run 99.0% by weight of the charge was accounted for in the recovered material. Conversion of ethylene was 49.9%; conversion of isobutane was 16.5%.

Table I

PRODUCT DISTRIBUTION IN RUN NO. 1

| Product | | Selectivity Moles per 100 Moles $C_2H_4$ Reacted | Percent by Wt. Based on Total Hydrocarbons Charged | Product Composition, Percent by Wt. Based on Total Product |
|---|---|---|---|---|
| Carbon Number | Compound | | | |
| 1 | Methane | 0.0 | 0.0 | 0.0 |
| 2 | Ethane | 3.2 | 0.3 | 1.3 |
| 3 | | 0.0 | 0.0 | 0.0 |
| 4 | (Excluding Isobutane) | ᵃ 3.9 | ᵃ 0.8 | 2.6 |
| 5 | | 1.6 | 0.4 | 1.6 |
| 6 | 2,2-Dimethylbutane | 48.5 | 14.6 | 59.4 |
| 6 | 2,3-Dimethylbutane | 0 | 0.0 | 0.0 |
| 6 | 2-Methylpentane | 2.6 | 0.8 | 3.2 |
| 8 | 2,2-Dimethylhexane | 5.8 | 2.3 | 9.4 |
| | Unidentified $C_8$ and Heavier, Wt. Percent | | 3.1 | 12.7 |

ᵃ Most of reported $C_4$ was in original feed.

The data in the last column of Table I show that 59.4% by weight of the total product was 2,2-dimethylbutane and that no 2,3-dimethylbutane was observed. The recovered ethane is a reaction product of the feed ethylene. The material of four carbon atoms per molecule is mainly n-butane and isobutene which were present as impurities in the feed. The only substantial amount of identified liquid product other than 2,2-dimethylbutane is 2,2-dimethylhexane, which occurred as about 9.4% by weight of the total product; an unidentified $C_8$ and heavier organic product occurred in about 12.7% concentration. The latter appears to be predominantly or entirely the product of the polymerization of ethylene, saturated by a subsequent hydrogen exchange.

EXAMPLE II

Run No. 2 was carried out in a similar manner to run No. 1 but using, instead of thiophenol, nitromethane, a "homogeneous catalyst" of the prior art. The run was carried out at 370° C. with a reaction time of one hour. The isobutane to ethylene mole ratio was 2.5:1. The conversion of ethylene was 53.9% while that of isobutane was 5.8%. The selectively (moles product per 100 moles $C_2H_4$ reacted) to 2,2-dimethylubutane was only 6.5% in this run; that to 2,2-dimethylhexane was 1.6%. The amount of unidentified $C_8$ and heavier organic product was 4.9% by weight, based on total hydrocarbon charged. No significant amount of 2,3-dimethylbutane was found.

EXAMPLE III

Runs Nos. 3 to 5 were carried out using oxygen in accordance with this invention, the procedure being similar to that of run No. 1 described in Example I. Oxygen was added to the initial reaction mixture by leaving a measured amount of air in the autoclave rather than evacuating it completely. The conditions under which these runs were carried out and the conversion of olefin and selectivity to 2,2-dimethylbutane are given in Table II. The corresponding data from run No. 1 are shown for comparison purposes.

*Table II*

| Run Number | 1 | 3 | 4 | 5 |
|---|---|---|---|---|
| Isobutane: Ethylene Mole Ratio | 2.0 | 2.1 | 2.6 | 2.2 |
| Promoter: | | | | |
| Thiophenol Concentration, Mole Percent | 1.1 | 1.0 | 1.2 | 1.1 |
| Oxygen Concentration, Mole per Mole of Thiophenol | 0.00 | 1.0 | 0.17 | 0.09 |
| Conditions: | | | | |
| Time, Hrs | 2 | 2 | 2 | 2 |
| Temperature, °C | 400 | 400 | 400 | 400 |
| Pressure, p.s.i.g | ca. 1,000 | ca. 1,000 | ca. 1,000 | ca. 1,000 |
| Conversion: Percent of Olefin Converted | 49.9 | 71.0 | 74.5 | 58.1 |
| Selectivity, Mole Percent: | | | | |
| Ethane | 3.2 | 3.7 | 4.3 | 3.8 |
| 2,2-Dimethylbutane | 48.5 | 52.2 | 49.6 | a 55.0 |
| 2,2-Dimethylhexane | 5.8 | 7.5 | 4.1 | a 6.6 |
| Unidentified $C_8$ and Heavier, Wt Percent | 3.1 | 3.4 | 3.3 | b 0.3 | a Actual value may be slightly lower.
b Actual value may be higher.

The results from runs Nos. 3, 4 and 5, shown in Table II, illustrate the effect of changing the oxygen concentration from an amount below the preferred to amount in the preferred range. The selectivity to 2,2-dimethylbutane and other compounds remained essentially unchanged and did not differ significantly from the selectivities in run No. 1 where no oxygen was added. The over-all ethylene conversion was substantially higher in runs Nos. 3–5, using oxygen in accordance with this invention. It was much higher in runs Nos. 3 and 4, where the amount of oxygen was in the preferred range. Increased olefin conversion without loss of selectivity during a fixed run time is proof of an increased rate of the desired alkylation reaction.

EXAMPLE IV

Runs Nos. 6 and 7 were carried out in a manner similar to runs Nos. 1 and 3–5, respectively. Run No. 7 is in accordance with this invention, using an amount of oxygen in the preferred concentration range. Run No. 6 is at otherwise identical conditions, but without oxygen. The runs differ from those of Example III in that the reaction time was only one-half as long. The conditions under which these runs were carried out and the conversion of olefin and selectivity to 2,2-dimethylbutane are given in Table III.

*Table III*

| Run Number | 6 | 7 |
|---|---|---|
| Isobutane: Ethylene Mole Ratio | 2.6 | 2.4 |
| Promoter: | | |
| Thiophenol Concentration, Mole percent | 1.0 | 1.2 |
| Oxygen Concentration, Mole per Mole of Thiophenol | 0.00 | 0.17 |
| Conditions: | | |
| Time, Hrs | 1 | 1 |
| Temperature, °C | 400 | 400 |
| Pressure, p.s.i.g | ca. 1,000 | ca. 1,000 |
| Conversion: Percent of Olefin Converted | 43.1 | 60.9 |
| Selectivity, Mole percent: | | |
| Ethane | 2.6 | 3.1 |
| 2,2-Dimethylbutane | 47.1 | a 60.9 |
| 2,2-Dimethylhexane | 4.5 | a 5.7 |
| Unidentified $C_8$ and Heavier, Wt. percent | 4.2 | b 0.2 | a Actual value may be slightly lower.
b Actual value may be higher.

Runs Nos. 6 and 7 again illustrate the effect of oxygen of causing a substantially higher conversion without detracting from the selectivity to desired compounds.

EXAMPLE V

Run No. 8 was carried out in a manner similar to run No. 7, but with a comparatively very high ratio of isobutane to olefin and at a somewhat higher pressure and lower promoter concentration. The conditions under which run No. 8 was carried out and the conversion of olefin and selectivity to several products are given in Table IV.

*Table IV*

| Run Number | 8 |
|---|---|
| Isobutane: Ethylene Mole Ratio | 11.5 |
| Promoter: | |
| Thiophenol Concentration, Mole percent | 0.5 |
| Oxygen Concentration, Mole per Mole of Thiophenol | 0.2 |
| Conditions: | |
| Time, Hrs | 1 |
| Temperature, °C | 400 |
| Pressure, p.s.i.g | ca. 1,250 |
| Conversion: Percent of Ethylene Converted | 79.0 |
| Selectivity, Mole Percent: | |
| Ethane | 1.6 |
| 2,2-Dimethylbutane | 74.5 |
| 2,2-Dimethylhexane | 1.8 |
| Unidentified $C_8$ and Heavier, Wt. percent | 1.1 |

This run demonstrates the excellent conversion and selectivity obtainable under these conditions.

EXAMPLE VI

Run No. 9 was made in a manner similar to run No. 8 of Example V but using propylene as the reactive olefin. The temperature was 400° C., the pressure 2150 p.s.i.g., the reaction time two hours, and the isobutane-to-propylene ratio 9.8:1. The sulfur compound promoter was thiophenol, employed in a concentration of 0.5 mole percent, based on total hydrocarbons, and the oxygen concentration was 0.2 mole per mole of thiophenol. The major reaction product was 2,2-dimethylpentane; hexanes, methylcyclopentane and other $C_6$ and $C_7$ hydrocarbons were also identified in the total product. Propylene conversion was 68.1%; selectivity to 2,2-dimethylpentane was 42.7 mole percent. Using oxygen establishes a satisfactory rate of reaction at a substantially lower pressure than would be required to obtain a similar rate at otherwise equal conditions but in the absence of oxygen.

EXAMPLE VII

Runs Nos. 10 and 11 were carried out in a manner similar to runs Nos. 1 and 3–5, respectively, but employing diphenyldisulfide as the sulfur compound promoter instead of thiophenol. Run No. 11 was made with oxygen in accordance with this invention. Run No. 10 is at otherwise essentially identical conditions but without oxygen. A substantial increase in ethylene conversion was obtained by proceeding in accordance with this invention.

Table V

| Run Number | 10 | 11 |
|---|---|---|
| Isobutane: Ethylene Mole Ratio | 2.2 | 2.3 |
| Promoter: | | |
| Diphenyldisulfide Concentration, Mole percent | 0.5 | 0.5 |
| Oxygen Concentration, Mole per Mole Diphenyldisulfide | 0.00 | 0.40 |
| Conditions: | | |
| Time, Hrs | 2 | 2 |
| Temperature, °C | 400 | 400 |
| Pressure, p.s.i.g | ca. 1,000 | ca. 1,000 |
| Conversion: Percent of Olefin Converted | 62.7 | 69.9 |
| Selectivity, Mole percent: | | |
| Ethane | 5.9 | 3.7 |
| 2,2-Dimethylbutane | 48.1 | 45.5 |
| 2,2-Dimethylhexane | 4.9 | 5.0 |
| Unidentified $C_8$ and Heavier, Wt. percent | 1.7 | 4.4 |

EXAMPLE VIII

When toluene is employed as the saturated feed component in a run carried out similar to run No. 4 of Example III or run No. 11 of Example VII, at a temperature of 400° C., a reaction time of two hours and a toluene-to-ethylene mole ratio of about 2.5:1, the major reaction product is n-propylbenzene.

EXAMPLE IX

When methyl mercaptan is substituted for thiophenol as the sulfur compound in a run carried out under the conditions of run No. 4 an olefin conversion in excess of 70% is obtained with a selectivity to 2,2-dimethylbutane of the order of 30%.

EXAMPLE X

When hydrogen sulfide is substituted for thiophenol at conditions otherwise similar to those of run No. 4 an olefin conversion in excess of 70% is obtained with a selectivity to 2,2-dimethylbutane in excess of 30%.

EXAMPLE XI

When dimethyldisulfide is substituted for diphenyldisulfide in a run carried out at the conditions of run No. 11 of Example VII approximately the same olefin conversion is obtained at a somewhat lower selectivity to 2,2-dimethylbutane.

We claim as our invention:

1. A process for alkylating a first hydrocarbon of the group consisting of saturated hydrocarbons and aryl-substituted alkanes with an olefinic hydrocarbon which comprises exposing a reaction mixture containing at least about one mole of saturated hydrocarbon per mole of olefinic hydrocarbon, and as the sole alkylation promoters from 0.1 to 5 mole percent, based on total hydrocarbons, of a sulfur compound selected from the group consisting of dihydrocarbyldisulfides, hydrogen sulfide and hydrocarbylthiols, together with from 0.05 to 5 moles of free oxygen per mole of said sulfur compound but not exceeding about 5 mole percent of oxygen, based on total hydrocarbons, to a reaction temperature of at least about 200 C. and below that at which substantial thermal cracking of said hydrocarbons takes place, at a pressure of at least about 150 p.s.i.g., higher pressures being employed at higher temperatures in the stated range.

2. A process in accordance with claim 1 in which said first hydrocarbon is a paraffin.

3. A process in accordance with claim 1 in which said first hydrocarbon is an aryl-substituted paraffin.

4. A process in accordance with claim 1 in which said sulfur compound is an arylthiol.

5. A process according to claim 1 in which said sulfur compound is an alkylthiol.

6. A process in accordance with claim 1 in which said sulfur compound is $H_2S$.

7. A process according to claim 1 in which said sulfur compound is dimethyldisulfide.

8. A process in accordance with claim 1 in which said sulfur compound is diphenyldisulfide.

9. A process in accordance with claim 1 in which the concentration of oxygen is in the range from 0.1 to 2 moles per mole of said sulfur compound.

10. A process for the production of gasoline boiling range hydrocarbons which comprises exposing a reaction mixture containing a paraffinic hydrocarbon having from three to six carbon atoms per molecule and an olefinic hydrocarbon having from two to five carbon atoms per molecule, in a ratio of at least about one mole of paraffin per mole of olefin and as the sole alkylation promoters from 0.1 to 5 mole percent, based on total hydrocarbons, of a sulfur compound selected from the group consisting of dihydrocarbyldisulfides, hydrogen sulfide and hydrocarbylthiols, together with from 0.05 to 5 moles of free oxygen per mole of said sulfur compound but not exceeding about 5 mole percent of oxygen, based on total hydrocarbons, in vapor phase to a reaction temperature of at least about 200° C. and below that at which substantial thermal cracking of said hydrocarbons takes place, at a pressure of at least about 650 p.s.i.g., higher pressures being employed at higher temperatures in the stated range.

11. A process in accordance with claim 10 in which the sulfur compound is an arylthiol and the paraffin is an isoparaffin.

12. A process in accordance with claim 10 in which the sulfur compound is an dihydrocarbyldisulfide and the paraffin is an isoparaffin.

13. A process for the production of gasoline boiling range hydrocarbons which comprises exposing a reaction mixture containing isobutane and an olefin having from two to three carbon atoms per molecule in a ratio of at least 2 moles of isobutane per mole of olefin and as the sole alkylation promoters from 0.1 to 5 mole percent, based on total hydrocarbons, of a sulfur compound selected from the group consisting of dihydrocarbyldisulfides, hydrogen sulfide and hydrocarbylthiols, together with from 0.05 to 5 moles of free oxygen per mole of said sulfur compound but not exceeding about 5 mole percent of oxygen, based on total hydrocarbons, in vapor phase, to a reaction temperature in the range between 300° and 450° C., at a pressure of at least about 650 p.s.i.g., higher pressures being employed at higher temperatures in the stated range.

14. A process in accordance with claim 13 in which said olefin is ethylene and in which the reaction product contains a substantial proportion of neohexane.

15. A process in accordance with claim 13 in which said olefin is propylene and in which the reaction product contains a substantial proportion of neoheptane.

16. A process for the production of a branched-chain hydrocarbon in the lubricating oil boiling range which comprises exposing a reaction mixture containing a long-chain paraffin having from fifteen to thirty carbon atoms per molecule and an olefinic hydrocarbon, in a ratio of at least 2 moles of paraffin per mole of olefin, and containing as sole alkylation promoters from 0.1 to 5 mole percent, based on total hydrocarbons, of a sulfur compound selected from the group consisting of dihydrocarbyldisulfides, hydrogen sulfide and hydrocarbylthiols, together with from 0.05 to 5 moles of free oxygen per mole of said sulfur compound but not exceeding about 5 mole percent of oxygen per mole of total hydrocarbons, in liquid phase to a reaction temperature of at least about 200° C. and below that at which substantial thermal cracking of said hydrocarbons takes place at a pressure of at least about 150 p.s.i.g., higher pressures being employed at higher temperatures in the stated range.

17. A process for the alkylation of an aryl-substituted alkane hydrocarbon which comprises exposing a mixture containing an aryl-substituted alkane and an olefinic hydrocarbon, at a ratio of at least one mole of arylalkane per mole of olefin and containing as the sole alkylation promoters from 0.1 to 5 mole percent, based on total hydrocarbons, of a sulfur compound selected from the group consisting of dihydrocarbyldisulfides, hydrogen sulfide and hydrocarbylthiols, together with from 0.05 to 5 moles of free oxygen per mole of said sulfur compound but not exceeding about 5 mole percent of oxygen per mole of total hydrocarbons to a reaction temperature of at least about 200° C. and below that at which substantial thermal cracking of said hydrocarbons takes place, at a pressure of at least about 150 p.s.i.g., higher pressures being employed at higher temperatures in the stated range, and recovering from the reaction mixture an alkylated aryl-substituted alkane hydrocarbon in which the aryl group has no more nuclear alkyl-substituent groups than the aryl group in the feed arylalkane hydrocarbon.

References Cited in the file of this patent

UNITED STATES PATENTS

| | | |
|---|---|---|
| 2,238,594 | Malishev | Apr. 15, 1941 |
| 2,326,587 | Vesterdal | Aug. 10, 1943 |
| 2,352,059 | Woog | June 20, 1944 |
| 2,403,314 | Tongberg | July 2, 1946 |